Oct. 18, 1966
T. N. HULL, JR ETAL
3,279,192
VARIABLE AREA EXHAUST NOZZLE
Filed Dec. 30, 1963
3 Sheets-Sheet 1
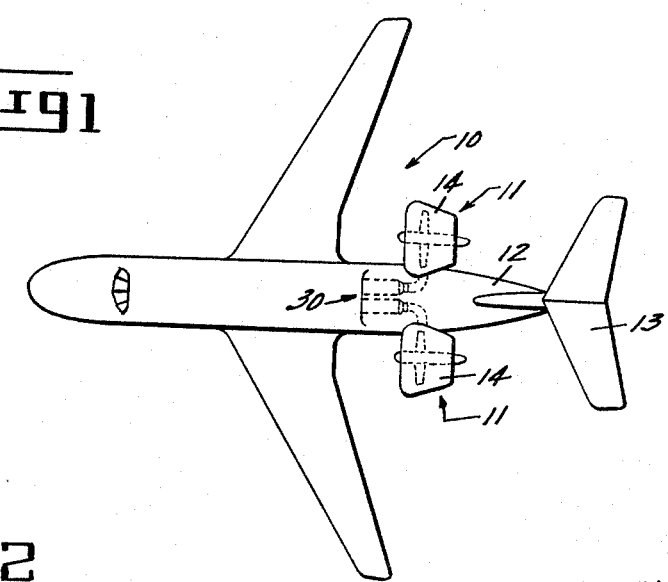
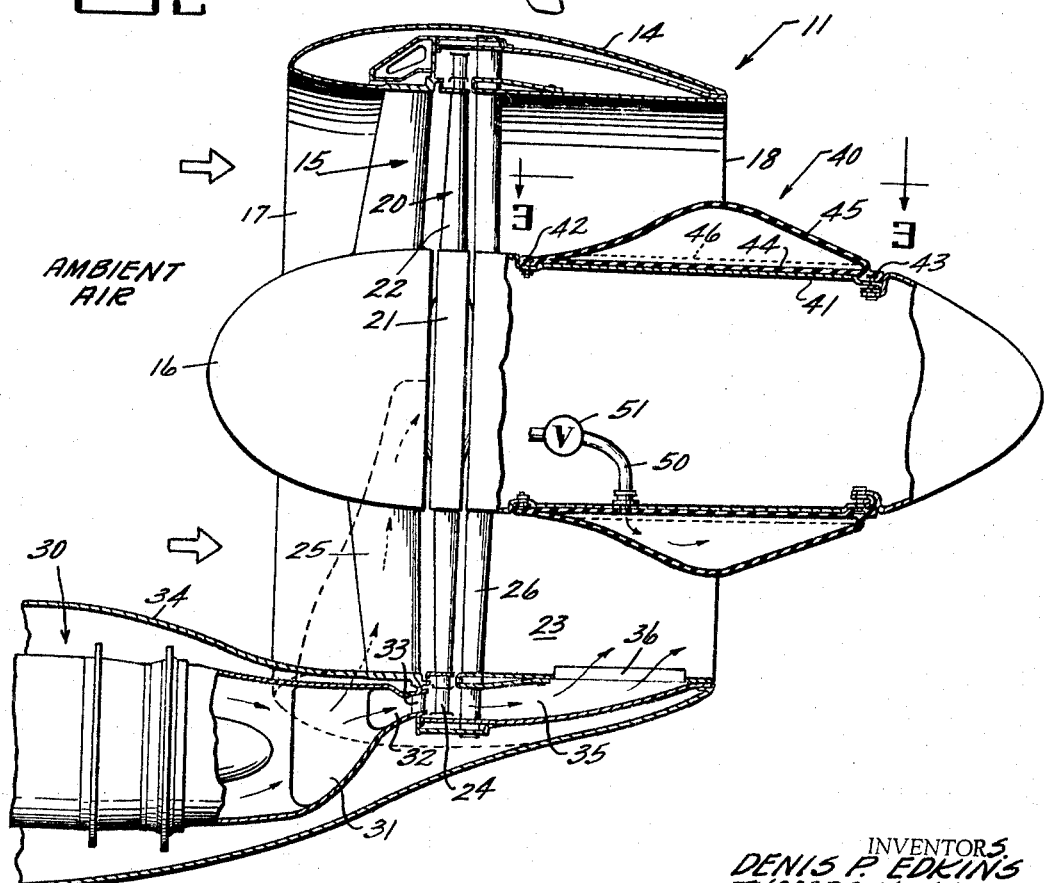
INVENTORS
DENIS P. EDKINS
THOMAS N. HULL, JR.
BY
George R. Powers
ATTORNEY—

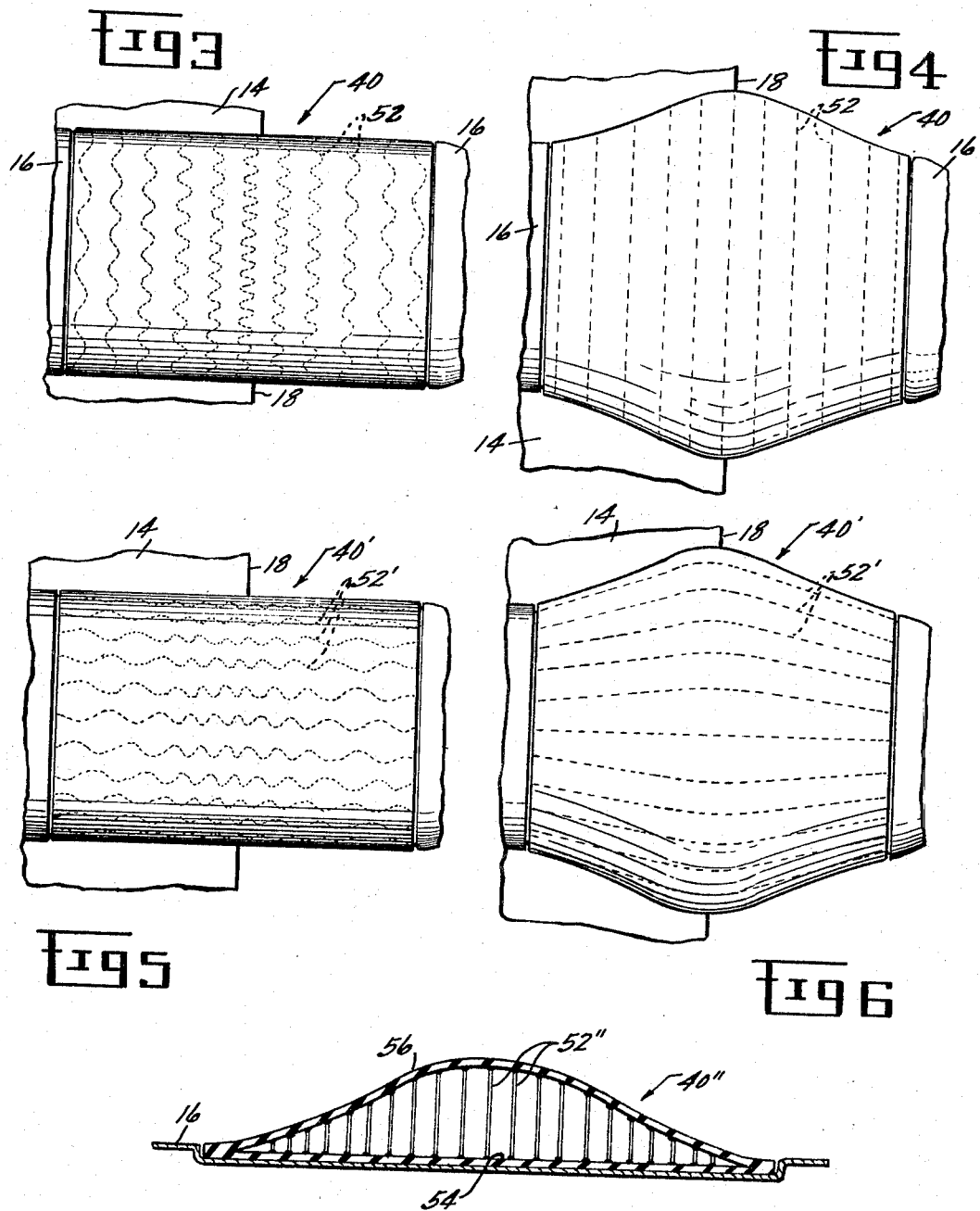

Oct. 18, 1966 T. N. HULL, JR ETAL 3,279,192
VARIABLE AREA EXHAUST NOZZLE
Filed Dec. 30, 1963 3 Sheets-Sheet 3
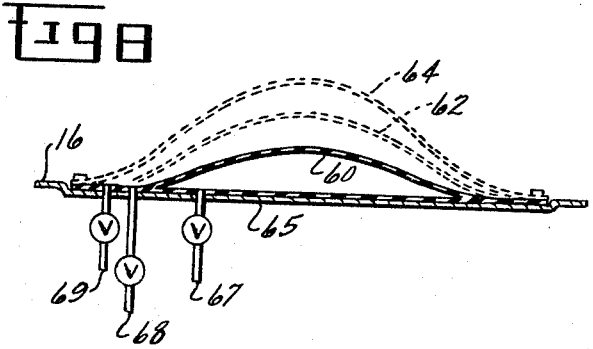
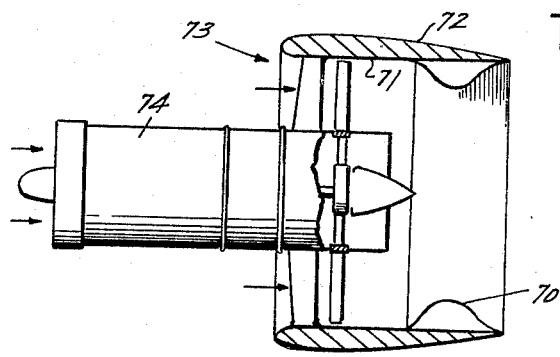
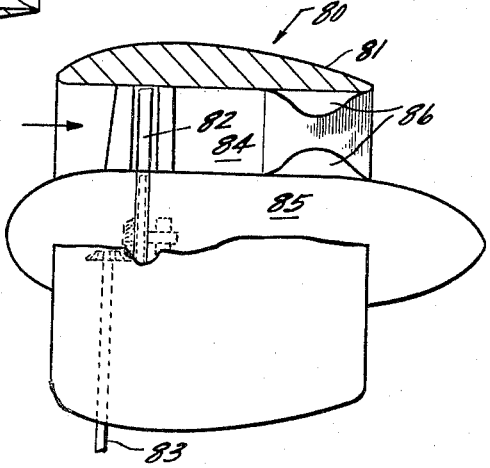
INVENTORS
DENIS P. EDKINS
THOMAS N. HULL, JR.
BY
George R. Powell
ATTORNEY United States Patent Office 3,279,192
Patented Oct. 18, 1966

3,279,192
VARIABLE AREA EXHAUST NOZZLE
Thomas Neil Hull, Jr., Marblehead, Mass., and Denis P. Edkins, Cincinnati, Ohio, assignors to General Electric Company, a corporation of New York
Filed Dec. 30, 1963, Ser. No. 334,137
5 Claims. (Cl. 60—264)

This invention relates to a variable area exhaust nozzle and, more particularly, to a variable area exhaust nozzle for a gas turbine engine of the fan type.

In order to maintain maximum engine efficiency over wide ranges of operating conditions, the cross-sectional area of a jet engine exhaust nozzle must be capable of controlled variation. Various complex systems have been previously employed for varying the exhaust area, these systems including axially adjustable conically shaped members located within the exhaust nozzle, radially adjustable conically shaped members similarly located, pivotable exhaust nozzle flap members, etc. All of these systems include complex control and adjusting devices involving many moving parts, the systems thus requiring careful and expensive maintenance. Additionally, these prior art variable area nozzles undesirably increase the jet engine weight, detrimentally affecting the weight-to-thrust ratio. Also, these prior art nozzles are not always capable of either varying the exhaust area as accurately as may be desired or maintaining a nozzle contour of the proper aerodynamic shape at all nozzle settings.

Various means which have previously been employed for controlling flow areas of gas turbine inlet nozzles and cross-sectional areas in other low temperature fluid-carrying ducts have been unsuccessful when used in jet engine exhaust nozzles because of the extremely high temperatures of the exhaust gases which customarily flow therethrough. For example, it has previously been unsatisfactory to employ elastic materials such as rubber as restrictors in gas turbine exhaust nozzles because of the inability of elastic material to withstand these high temperatures. The present invention overcomes the above disadvantages of prior art variable area exhaust nozzles by providing an arrangement which permits the utilization of an elastic, lightweight, expansible diaphragm or boot mounted within the exhaust nozzle of a jet propulsion engine of the fan type to control the nozzle area.

Accordingly, it is one object of the present invention to provide a lightweight, inexpensive, and relatively simple variable area exhaust nozzle for jet propulsion engines of the fan type.

It is another object of the present invention to provide a variable area exhaust nozzle capable of accurate cross-sectional area adjustment.

It is a further object of the present invention to provide a variable area exhaust nozzle capable of accurately controlling of the nozzle interior contour.

Further objects and attendant advantages of this invention will become better understood from the following description and the features of novelty which characterize this invention will be pointed out with particularity in the claims annexed to and forming part of the specification.

Briefly stated, in accordance with an illustrated embodiment of this invention, an elastic diaphragm is mounted within the exhaust nozzle downstream from the fan blades of a tip turbine fan of either the "cruise fan" or "lift fan" type. The upstream and downstream ends of the diaphragm or boot are hermetically sealed to the fan hub. Compressor bleed air is supplied to the diaphragm to inflate the diaphragm and cause it to expand outwardly into and reduce the exit area of the exhaust nozzle. The magnitude of expansion and the resulting contour of the inflated diaphragm is controlled by a plurality of restraining members. In accordance with other illustrated embodiments of the invention, the details of construction of the expansible diaphragm may vary to accommodate differences in engine and fan design.

While the specification concludes with claims particularly pointing out and distinctly claiming the subject matter which is regarded as the invention, it is believed that the invention will be better understood from the following description taken in connection with the accompanying drawings in which:

FIGURE 1 is a pictorial view of an aircraft having a pair of cruise fan engines mounted thereon;

FIGURE 2 is a sectional view of the rear portion of the cruise fan engine of FIGURE 1, the engine having a variable area exhaust nozzle formed in accordance with one embodiment of this invention;

FIGURE 3 is a view taken along line 3—3 of FIGURE 2 illustrating restraining cords embedded in the expansible diaphragm of the variable area nozzle, the diaphragm being in its deflated position;

FIGURE 4 is a view similar to FIGURE 3 with the diaphragm being in its inflated position;

FIGURE 5 is a view similar to FIGURE 3 showing an alternative arrangement of restraining cords, the diaphragm being shown in its deflated position;

FIGURE 6 is a view similar to FIGURE 4 with the diaphragm being in its inflated position;

FIGURE 7 is a cross-sectional view of another arrangement of restraining cords in the inflated position;

FIGURE 8 is a schematic representation of the variable portion of an exhaust nozzle illustrating an embodiment of this invention in which multiple diaphragms are used;

FIGURE 9 is a schematic representation of a conventional bypass engine illustrating another embodiment of the invention;

FIGURE 10 is a schematic representation of another embodiment of the invention which is particularly suited for use with shaft-driven fan engines.

Referring first to FIGURE 1, there is illustrated an aircraft 10 having a pair of cruise engines 11 symmetrically mounted on opposite sides of the fuselage 12 just forward of the tail assembly 13. With reference to FIGURE 2, one of the cruise fan engines 11 is illustrated in cross-section. The fan engine 11 comprises a hollow, annular casing 14 concentrically within which a single-stage fan 15 is mounted on a hub 16. The hub 16 extends from a point just upstream of the fan inlet 17 through the casing 14 to a point downstream of the fan exhaust nozzle 18. The fan 15, which consists of a single-stage, free-floating rotor having a plurality of blades 20, is supported on a portion 21 of the hub 16 which is mounted for rotation about an axis concentric with the fan casing axis. The blades 20 are divided radially into two sections. The first or compressor section 22 encompassing a radial majority of each rotor blade 20, spans the entire annular airflow passage 23 between the casing 14 and the hub 16 and is designed as a compressor blade. A second or turbine section 24, which forms the tip of each rotor blade 20 and which rotates internally within the hollow casing 14, is designed as a turbine blade. A series of vanes 25 attached to the forward portion of the hub 16 upstream of the rotor blades 20 maintain the rotor-hub assembly in proper concentric position within the casing 14. A plurality of circumferentially spaced contravanes or straighteners 26 are mounted immediately downstream of the rotor blades 20 and serve the purposes of directing the airflow toward and into the fan exhaust nozzle 18 and helping to support the rotor-hub assembly within the casing 14.

Still referring to FIGURE 2, a gas generator 30 is illustrated, the gas generator producing a supply of high temperature exhaust gases which are directed through a duct 31 to a turbine nozzle 32 having a plurality of nozzle partitions 33 mounted therein. The gas generator 30 partially illustrated in FIGURE 2 is basically a conventional turbojet engine having an axial flow compressor, a combustor, and a turbine for driving the compressor enclosed within a casing 34. Very high temperature exhaust gases produced by the gas generator 30 and delivered to the turbine nozzle 32 through the duct 31 are directed at the proper angle of attack to the turbine section 24 of the fan rotor blade 20 by the turbine nozzle partitions 33. The hot exhaust gas imparts energy to the turbine section 24 to drive the fan rotor. The spent exhaust gases are then ducted via a passage 35 through an opening 36 in the inner surface of the casing 14 near the exit end thereof from which the exhaust gases pass through the exhaust nozzle 18 of the fan engine 11. Air entering the fan inlet 17 flows through the compressor section 22 of the rotor blades 20 where it experiences a pressure rise. It then flows through the circumferentially spaced contravanes 26, the contravanes partially straightening the direction of airflow. It will be noted that the fluid flowing through the annular airflow passage 23 downstream of the contravanes 26 and the exhaust gas exhaust opening 36 is stratified into an inner annular layer of relatively cold air adjacent the rear portion of the hub 16 and an outer annular layer of hot exhaust gases adjacent the inner surface of the casing 14.

In order to provide controlled variation of the cross-sectional area of the exhaust nozzle 18, an inflatable elastic diaphragm or boot 40 is placed tightly about the rear portion of the hub 16. As may be seen in FIGURE 2, the diaphragm 40 extends from a point immediately downstream of the contravanes 26 to a point on the hub 16 downstream of the fan engine exhaust nozzle 18. A shallow channel 41 may be provided around the hub 16 to receive the diaphragm 40, thus ensuring a continuous surface which does not interfere with the airflow through the passage 23 when the boot 40 is deflated as indicated by the dotted line 46. The ends 42 and 43 of the diaphragm 40 are mounted to the hub 16 by any suitable means which permits inflation of the diaphragm. The illustrated, preferred embodiment employs a diaphragm 40 comprising two layers 44 and 45 sealingly engaging one another at their ends, such as through vulcanization, to provide an air-tight envelope surrounding the hub 16.

The flexible diaphragm 40 can be formed from any rubber-like material, provided that the material is sufficiently elastic to permit expansion thereof under the application of a high pressure fluid and to permit essentially instantaneous resumption to its initial unstretched position, illustrated by the dotted line 46 in FIGURE 2, upon the elimination of the fluid pressure. Such elastic materials can be used since the diaphragm 40 is only exposed to the layer of relatively cold air adjacent the rear portion of the hub 16 and not to the layer of hot exhaust gases adjacent the casing 14.

In order to provide for controlled inflation of the diaphragm 40, a conduit 50 is mounted interiorly of the hub 16 and communicates with the diaphragm 40. The conduit 50 is connected with any suitable source of pressurized fluid, such as bleed air from the compressor of the gas generator 30. Means for controlling the flow of fluid to inflate the diaphragm 40 is provided by a two-way valve 51 which permits selective control for inflation and deflation. The valve 51 may be operated directly by the pilot or may be automatically controlled by the fuel control system or some other flight-condition sensitive means.

The outer layer 45 of diaphragm 40 is shown in FIGURE 2 in its inflated position by a solid line and in its deflated position by a dotted line 46. It should be noted that, in the inflated position, the diaphragm 40 forms a continuous, uninterrupted surface with the hub 16 and is of a desired aerodynamic shape. To control the expanded shape of the diaphragm 40 and the magnitude of inflation thereof, a plurality of restraining members or cords 52 extend circumferentially of the diaphragm as illustrated by FIGURE 3. While the cords can be attached to the surface of the diaphragm, a preferred form is to have the cords imbedded within the diaphragm. The restraining cords 52 are flexible and inelastic. As a result, the cords 52 assume the serpentine shapes illustrated by FIGURE 3 when the diaphragm 40 is deflated. The diaphragm 40 can be expanded until the cords 52 are tensioned and assume the position shown by FIGURE 4. The cords 52 have unequal extended lengths or, in other words, upon complete inflation of the diaphragm 40 and tensioning of each of the cords 52, the circumferential length of the cords is unequal. By proper choice of the extended lengths of the various cords 52, any desired aerodynamic shape of the inflated diaphragm 40 is obtainable.

FIGURE 5 illustrates an alternative arrangement of restraining cords 52'. The restraining cords 52', which extend axially rather than circumferentially of the diaphragm 40', assume serpentine shapes when the diaphragm 40' is deflated and are fully extended when the diaphragm is inflated as shown in FIGURE 6. In practice, it may be convenient to use the circumferential cords 52 and the axial cords 52', in combination.

Another alternative arrangement of restraining members is illustrated by FIGURE 7 wherein the inflated shape of an expansible diaphragm 40" is controlled by a plurality of unequal length cords 52" extending radially between the inflated diaphragm 40" and the hub 16, as distinguished from the circumferential cords 52 of FIGURES 3 and 4 and the axial cords 52' of FIGURES 5 and 6. The radially inner end of the cords 52" may be attached directly to the hub 16; however, in the preferred form of this embodiment, as with the first embodiment, a dual layer diaphragm is employed to provide an air-tight envelope. The dual layer diaphragm has a layer 54 which remains contiguous the hub 16 during expansion of an outer layer 56. In this preferred embodiment, the radially inner end of cords 52" are connected to the inner diaphragm layers 54 instead of directly to the hub 16. Attachment of the cords 52" to the diaphragm is achieved by molding the cords to the diaphragm 40". The extended lengths of the individual cords 52" are chosen such that upon inflation of the diaphragm 40", the required aerodynamic contour is attained.

Due to the possible wide range of operating conditions, it may be desirable to have a wide range of easily attainable exhaust nozzle areas. One method for obtaining a variety of nozzle areas and contours is to employ a plurality of diaphragms 60, 62, 64 in stacked formation as illustrated in FIGURE 8 where the first diaphragm 60 is shown in its inflated position, and the inflated positions of diaphragms 62 and 64 are indicated by dotted lines. In their deflated positions, each of the diaphragms 60, 62, 64 tightly fit about the hub 16 in contiguous relationship therewith so as not to interfere with the airflow path through the exhaust nozzle. To ensure such non-interference, a shallow channel 65 is provided around the surface of the hub 16. A supply conduit 67 extends through the hub surface and communicates with the first diaphragm 60 to provide a supply of pressurized fluid thereto when so desired. Inflation of the first diaphragm 60 causes the second and third diaphragms 62 and 64 to expand with the first diaphragm 60 but to remain contiguous therewith. A second supply conduit 68 communicates with the second diaphragm 62 to supply pressurized fluid between the second diaphragm 62 and the first diaphragm 60. When it is desired to reduce the exit area beyond the reduction achieved with the first diaphragm 60, fluid is supplied through the second supply conduit 68 to inflate diaphragm 62. Further reduction of the exit area is available by supplying pressurized fluid to the third diaphragm 64 through a third supply conduit 69. Each of the supply conduits 67, 68, and 69 is individually controlled to provide inflation of each diaphragm. The extent of inflation of each of the respective diaphragms is controlled by either circumferential, axial, or radial cords, or by a suitable combination as described above.

While the arrangements discussed above involve mounting the diaphragms on the fan hub, it should be noted that similar exhaust nozzle area control may be provided for conventional bypass fan engines by mounting one or more diaphragms 70 on the inner surface 71 of the exhaust casing 72, as illustrated in FIGURE 9. The use of elastic materials for the diaphragms 70 is possible since the diaphragms are contacted only by the relatively cold, outer annular layer of bypass air flowing through the bypass fan 73 and not by the hot exhaust gases produced by the gas generator 74.

Referring now to FIGURE 10, a ducted propeller engine 10 is illustrated. The engine 80 has a casing 81 enclosing a fan rotor 82 rotatably driven through a shaft 83 which is in turn driven by a suitable power source such as a turboshaft engine (not shown). It will be noted that no hot exhaust products are flowing through the annular airflow passage 84 defined between the casing 81 and the hub 85. Consequently, one or more diaphragms 86 can be employed on both the inner surface of the casing 81 and the outer surface of the hub 85. These diaphragms 86 can be operated in combination to produce a desired nozzle configuration.

It will be appreciated from the foregoing detailed description that the present invention makes possible the use of a simply constructed, lightweight, elastic diaphragm for controlling the exit area of exhaust nozzles for fan-type engines. The high temperature turbine exhaust gases are not detrimental to the elastic material because the diaphragms are positioned so as to avoid contact with the hot gases.

It should be understood that while specific forms of this invention have been shown and described above, it will be apparent to those skilled in the art that numerous changes and substitutions of equivalents might be made. For example, the particular means for mounting the diaphragms and the manner in which they are supplied with pressurized fluid are merely illustrative of various methods which can be successfully employed. Also, while the invention has been described with respect to cruise fan and conventional bypass fan engines, it will be obvious to those skilled in the art that the invention is equally applicable to engines of the lift fan type for VTOL—vertical take-off and landing—aircraft. Furthermore, if precise control is not necessary, the diaphragms may extend about only a portion of the exhaust nozzle instead of being complete annular structures. Therefore, it is intended by the claims which conclude this specification to cover all such changes and modifications as fall within the true spirit and scope of this invention.

What is claimed as new and desired to secure by Letters Patent of the United States is:

1. An aircraft powerplant comprising:
    (a) a gas generator,
    (b) a fan including blades having a compressor section and a turbine section,
    (c) means for supplying the hot gases produced by said gas generator to the turbine sections of said fan blades to drive said fan,
    (d) inlet means for supplying air to the compressor sections of said fan blades,
    (e) an annular exhaust nozzle downstream of said fan for receiving air from the compressor sections of said fan blades, said exhaust nozzle including,
        (i) a first member defining the outer boundary of the annular flow path, and
        (ii) a second member defining the inner boundary of the annular flow path,
    (f) means directing the hot gases exhausted from the turbine sections of said fan blades along the surface of one of said first and second members,
    (g) an elastic diaphragm mounted on the other of said first and second members,
    (h) and means to supply pressurized fluid to said diaphragm for effecting expansion thereof into said flow path to restrict the cross-sectional area of said exhaust nozzle.

2. An aircraft powerplant as defined in claim 1 wherein said diaphragm comprises a pair of layers, corresponding ends of each of said layers hermetically interengaging one another to form an airtight envelope, and said pressurized fluid supplying means delivering the fluid intermediate said layers.

3. An aircraft powerplant as defined in claim 1 including a plurality of restraining members associated with said diaphragm for limiting the expansion of said diaphragm to control the shape of said diaphragm when said diaphragm is inflated.

4. An aircraft powerplant as defined in claim 1 including a plurality of inelastic restraining members imbedded within said diaphragm for limiting the expansion of said diaphragm to control the shape of said diaphragm when said diaphragm is inflated.

5. An aircraft powerplant as defined in claim 4 in which various ones of said restraining members have different lengths.

References Cited by the Examiner
UNITED STATES PATENTS

| | | | |
|---|---|---|---|
| 2,737,019 | 3/1956 | Billman | 230—114 |
| 3,060,679 | 10/1962 | Schmitt | 60—35.6 |

MARK NEWMAN, *Primary Examiner.*

RALPH D. BLAKESLEE, *Examiner.*